No. 685,851. Patented Nov. 5, 1901.
G. M. KIFER & H. G. SINDORF.
HOSE COUPLING.
(Application filed May 13, 1901.)
(No Model.)
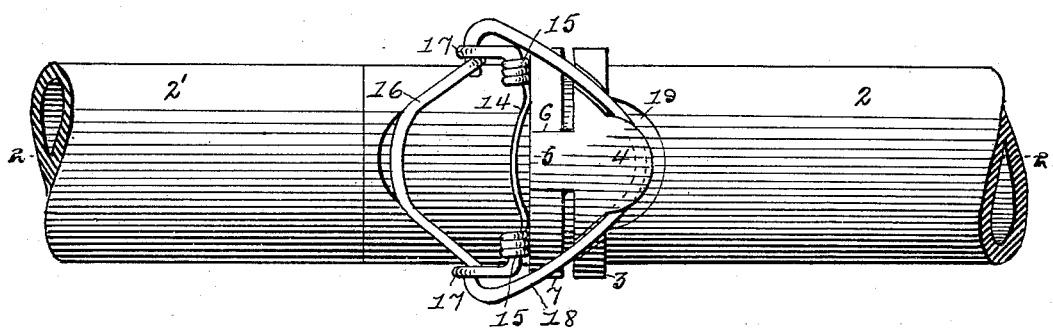
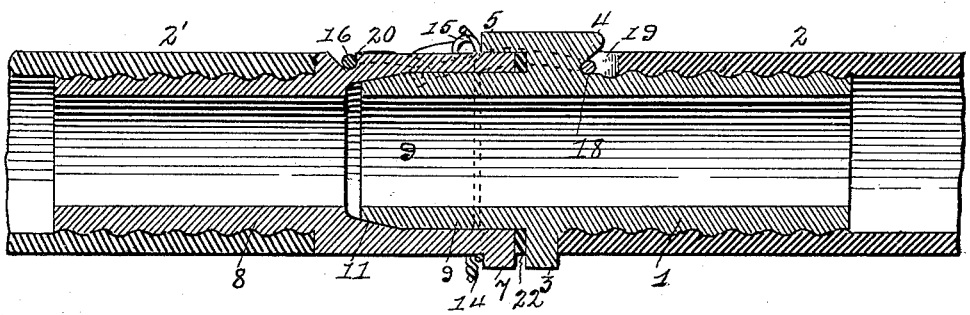
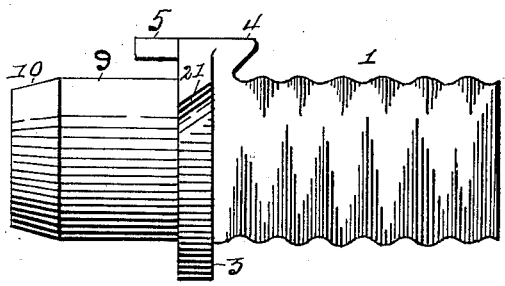
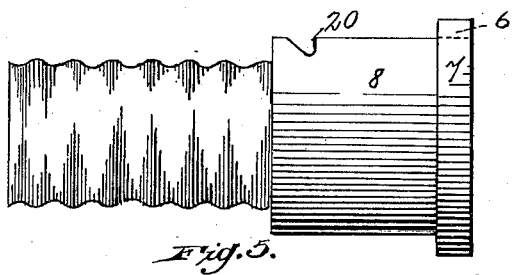
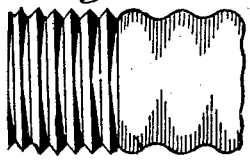
Witnesses:
J. P. Appleman
M. Hunter
Inventors,
G. M. Kifer
H. G. Sindorf
By O. D. Levis
Atty.

UNITED STATES PATENT OFFICE.

GEORGE M. KIFER AND HENRY G. SINDORF, OF PENNS STATION, PENNSYLVANIA.

HOSE-COUPLING.

SPECIFICATION forming part of Letters Patent No. 685,851, dated November 5, 1901.

Application filed May 13, 1901. Serial No. 60,019. (No model.)

*To all whom it may concern:*

Be it known that we, GEORGE M. KIFER and HENRY G. SINDORF, citizens of the United States of America, residing at Penns Station, in the county of Westmoreland and State of Pennsylvania, have invented certain new and useful Improvements in Hose-Couplers; and we do hereby declare the following to be a full, clear, and exact description thereof, reference being had to the accompanying drawings, which form a part of this specification.

This invention relates to certain new and useful improvements in hose-couplers, and has for its main object to construct simple and effective means whereby two pieces of hose or tubing may be quickly connected together or disconnected when desired.

In the accompanying drawings, showing a practical form of our invention, Figure 1 is a side elevation of our improved coupler in position coupling two pieces of hose together. Fig. 2 is a central longitudinal sectional view of the same. Fig. 3 is a detail side elevation of the male coupling member detached from the hose. Fig. 4 is a like view of the female member. Fig. 5 is a modified form of either Fig. 3 or Fig. 4, in which angular threads are shown.

To put our invention into practice, we provide a male and a female coupling member, the male member consisting of a tube 1, provided with a corrugated or threaded periphery to receive and hold the one part 2 of the hose firmly thereon. This male member of the coupling is provided with an integral annular flange or collar 3, flattened and enlarged on the upper side of the coupling. This enlarged portion or head extends or projects outwardly to each side of the flange or collar, the one ear or projection 4 having a rounded edge and being adapted to receive one of the clamping-wires employed in the connection, while the other lug 5 projects in the opposite direction and is adapted to lie in a notch or recess 6, provided therefor in an annular flange or collar 7, that is formed integral with the female member 8 at its inner end. This female member 8 is likewise provided with corrugations or threads to receive the other piece of hose 2'. The end of the female member of the coupling is chamfered out to receive the tubular extension formed on the male member, this tubular extension 9 having a beveled seat 10 to engage the beveled seat 11 in the interior wall of the female coupling. When the male and female members have been engaged the one with the other, they are locked and held in this position by means of two bails or clamping-wires, as will now be described. A wire 14 is bound around the female member just back of its flange or collar, this wire being coiled at the upper side of the coupling to form eyes 15. These eyes 15 receive the projecting ends of the wire out of which the locking-bail 16 is formed, this wire being also coiled or looped near its ends to form eyes 17 to receive the angular ends of the wire from which the bail 18 is formed. The parts are locked in position by first engaging the bail 18 with the ear or projection 4, which may be done by cutting the hose away, as shown at 19, and then forcing the locking-bail 16 down into engagement with the female member and into engagement with a shoulder 20, formed on said member by providing the member with a recess, as shown. To unlock, the bail 18 may be disengaged from the ear or projection by an upward pull on the bail 16, moving said bail 16 to a vertical position, which on account of the shifting of the fulcrum-points of the bail 18 allows the detachment of the latter from the ear or projection 4 and the removal of the one coupling member from the other. The annular flange or collar 3 of the male member is preferably provided with recesses 21 to receive the two arms of the bail 18, as shown, in order that the locking-bail may be forced down to the locking position. We may also place a washer or gasket 22 on the extension of the male member, and this washer or gasket when the members are connected will be compressed between the flanges or collars of the two members, as shown in Fig. 2.

With this construction it will be observed that the two pieces of hose may be quickly coupled or uncoupled, and it is believed that further detail description of the operation is unnecessary.

While the construction as herein shown embodies a practical form of our invention, yet we do not desire to unduly limit ourselves thereto, but desire to make such changes as will come clearly within the scope of the invention.

Having fully described our invention, what we claim as new, and desire to secure by Letters Patent, is—

1. A hose-coupler comprising a male and a female member, the male member having an integral ear and an integral lug projecting in opposite directions, and a clamping device for holding the members in engagement with each other, said clamping device comprising a wire bound upon the female member and provided with eyes, a bail having its fulcrum-point in said eyes and adapted to engage the ear carried by the male member, said bail being provided with eyes, and a locking-bail having the fulcrum thereof in the eyes of the wire bound upon the female member, substantially as described.

2. A hose-coupling comprising a male and a female member, the male member having an integral ear 4, and an oppositely-projecting lug 5, said female member having a groove in its circumference, said lug designed to project over the end of said female member, a locking device having two bails carried by the female member, one of said bails engaging about said ear, the other in a groove in the circumference of the female member, as set forth.

3. The combination with the male member having a flanged end, with diagonally-disposed grooves in said flanges, an ear integral with said member, and an oppositely-disposed lug projecting beyond said flange, a female member telescoping over the end of said male member, and having a recessed flange to receive said lug, and grooved on its circumference, a locking member having two bails one of which engages said ear and grooved flange, the other resting in the groove in the female member, as set forth.

In testimony whereof we have hereunto affixed our signatures in the presence of two subscribing witnesses.

GEORGE M. KIFER.
HENRY G. SINDORF.

Witnesses:
JOHN GROETZINGER,
M. HUNTER.